United States Patent
Hosono et al.

(10) Patent No.: US 11,964,260 B2
(45) Date of Patent: *Apr. 23, 2024

(54) METHOD FOR MANUFACTURING AMMONIA SYNTHESIS CATALYST, AND METHOD FOR MANUFACTURING AMMONIA

(71) Applicants: Tokyo Institute of Technology, Tokyo (JP); Tsubame BHB Co., Ltd., Tokyo (JP)

(72) Inventors: Hideo Hosono, Meguro-ku (JP); Masaaki Kitano, Meguro-ku (JP); Toshiharu Yokoyama, Meguro-ku (JP); Jiang Li, Meguro-ku (JP); Shigeki Kawamura, Meguro-ku (JP); Kazuhisa Kishida, Meguro-ku (JP)

(73) Assignees: Tokyo Institute of Technology, Tokyo (JP); Tsubame BHB Co., Ltd., Tokyo (JP)

(*) Notice: Subject to any disclaimer, the term of this patent is extended or adjusted under 35 U.S.C. 154(b) by 533 days.

This patent is subject to a terminal disclaimer.

(21) Appl. No.: 17/060,641

(22) Filed: Oct. 1, 2020

(65) Prior Publication Data
US 2021/0016254 A1    Jan. 21, 2021

Related U.S. Application Data

(62) Division of application No. 16/323,745, filed as application No. PCT/JP2017/028739 on Aug. 8, 2017, now Pat. No. 11,235,310.

(30) Foreign Application Priority Data

Aug. 8, 2016 (JP) .................... 2016-155951

(51) Int. Cl.
B01J 23/58 (2006.01)
B01J 21/04 (2006.01)
(Continued)

(52) U.S. Cl.
CPC ............... *B01J 23/58* (2013.01); *B01J 21/04* (2013.01); *B01J 23/462* (2013.01); *B01J 35/10* (2013.01);
(Continued)

(58) Field of Classification Search
CPC . B01J 23/58; B01J 21/04; B01J 23/462; B01J 35/10; B01J 35/1009; B01J 37/0201;
(Continued)

(56) References Cited

U.S. PATENT DOCUMENTS 6,479,027 B1   11/2002  Jacobsen
2008/0038186 A1  2/2008  Lomax, Jr. et al.
(Continued)

FOREIGN PATENT DOCUMENTS

CN   103237599 A   8/2013
JP   2001089135 A   4/2001
(Continued)

OTHER PUBLICATIONS

Szmigiel et al. "The Kinetics of Ammonia Synthesis over Ruthenium-Based Catalysts: The Role of Barium and Cesium" Journal of Catalysis 205, 205-212 (2002) (Year: 2002).*
(Continued)

*Primary Examiner* — Anthony J Zimmer
*Assistant Examiner* — Syed T Iqbal
(74) *Attorney, Agent, or Firm* — CHRISTENSEN O'CONNOR JOHNSON KINDNESS PLLC (57) ABSTRACT

Provided is a method for manufacturing a catalyst with which it is possible to obtain a supported metal ammonia synthesis catalyst, in which there are restrictions in terms of
(Continued)

producing method and producing facility, and particularly large restrictions for industrial-scale producing, in a more simple manner and so that the obtained catalyst has a high activity. This method for manufacturing an ammonia synthesis catalyst includes: a first step for preparing $12CaO \cdot 7Al_2O_3$ having a specific surface area of 5 m²/g or above; a second step for supporting a ruthenium compound on the $12CaO \cdot 7Al_2O_3$; and a third step for performing a reduction process on the $12CaO \cdot 7Al_2O_3$ supporting the ruthenium compound, obtained in the second step. This invention is characterized in that the reduction process is performed until the average particle diameter of the ruthenium after the reduction process has increased by at least 15% in relation to the average particle diameter of the ruthenium before the reduction process.

2 Claims, 4 Drawing Sheets (51) Int. Cl.
*B01J 23/46* (2006.01)
*B01J 35/10* (2006.01)
*B01J 37/02* (2006.01)
*B01J 37/08* (2006.01)
*B01J 37/18* (2006.01)
*C01C 1/04* (2006.01)

(52) U.S. Cl.
CPC ....... *B01J 35/1009* (2013.01); *B01J 37/0201* (2013.01); *B01J 37/08* (2013.01); *B01J 37/18* (2013.01); *C01C 1/04* (2013.01); *C01C 1/0411* (2013.01); *Y02P 20/52* (2015.11)

(58) Field of Classification Search
CPC .. B01J 37/08; B01J 37/18; B01J 23/02; C01C 1/04; C01C 1/0411; Y02P 20/52
See application file for complete search history.

(56) References Cited

U.S. PATENT DOCUMENTS

| | | |
|---|---|---|
| 2013/0183224 A1 | 7/2013 | Hosono et al. |
| 2015/0217278 A1 | 8/2015 | Hosono et al. |
| 2015/0239747 A1 | 8/2015 | Hosono et al. |
| 2015/0353369 A1 | 12/2015 | Sekine et al. |

FOREIGN PATENT DOCUMENTS

| | | |
|---|---|---|
| JP | 2001-149780 A | 6/2001 |
| JP | 2014-171916 A | 9/2014 |
| WO | 2012/077658 A1 | 6/2012 |
| WO | 2014/034473 A1 | 3/2014 |

OTHER PUBLICATIONS

Bartl, V.H., and Thomas Scheller, "Zur Struktur des 12CaO • 7Al2O3," Neues Jahrbuch fur Mineralogie, Monatshefte, pp. 547-552, 1970.
Hayashi et al., "Ammonia Decomposition by Ruthenium Nanoparticles Loaded on Inorganic Electride C12A7:e–," Chemical Science 4:3124-3130, 2013.
International Search Report dated Sep. 19, 2017, issued in corresponding International Application No. PCT/JP2017/028739, filed Aug. 8, 2017, 4 pages.
Inoue et al., "Highly Dispersed Ru on Electride [Ca24Al28O64]4+ (e–)4 as a Catalyst for Ammonia Synthesis," ACS Catalysis 4:674-680, Jan. 2014.
Matsuishi S., et al., "High-Density Electron Anions in a Nanoporous Single Crystal: [Ca24Al28O64]4+(4e–)," Science 301(5633):626-629, Aug. 2003.
Office Action dated Sep. 21, 2020, from U.S. Appl. No. 16/323,745, filed Feb. 6, 2019, 6 pages.
Office Action dated Feb. 24, 2021, from U.S. Appl. No. 16/323,745, 7 pages.
China National Intellectual Property Administration, Office Action with partial English translation of Search Report issued in CN Application No. 201780048022.7, dated Jul. 5, 2021, 12 pages.
United States Patent and Trademark Office, Final Office Action issued in U.S. Appl. No. 16/323,745, dated Jun. 9, 2021, 9 pages.

* cited by examiner

FIG. 7 under an atmosphere of an inert gas (Ar or the like). Therefore, the reaction operation becomes complicated. Particularly when the manufacturing scale becomes large, a dedicated manufacturing apparatus is required. There is concern that load of manufacturing facilities and manufacturing cost will increase.

METHOD FOR MANUFACTURING AMMONIA SYNTHESIS CATALYST, AND METHOD FOR MANUFACTURING AMMONIA

TECHNICAL FIELD

The present invention relates to a method for manufacturing an ammonia synthesis catalyst and a method for manufacturing ammonia.

Priority is claimed based on Japanese Patent Application No. 2016-155951 filed in Japan on Aug. 8, 2016, the contents of which are hereby incorporated by reference.

BACKGROUND ART

Nitrogen fertilizers, such as ammonium sulfate and urea, widely used in agricultural production, are produced using ammonia as a main raw material. Therefore, ammonia has been studied as a very important chemical raw material and its production method has been studied.

The most widely used ammonia production technology is the Harbor-Bosch method. The Haber-Bosch method is a method for manufacturing ammonia, and the method includes contacting nitrogen and hydrogen as a raw material with a catalyst containing iron as a main component at high temperature and high pressure.

As a synthesis method other than the Harbor-Bosch method, a synthesis method using a metal-supported catalyst in which a metal such as Ru, Co, Fe or the like is supported on various supports has been studied.

On the other hand, there is a compound called "mayenite-type compound", which is a calcium aluminosilicate containing CaO, $Al_2O_3$, and $SiO_2$. The compound has the same type of crystal structure as that of mayenite. The representative composition of the mayenite-type compound is represented by $12CaO \cdot 7Al_2O_3$.

The mayenite-type compound has the following structure (Non-Patent Document 1). In a unit cell containing two molecular formulae, there are 66 oxide ions. Among the 66 oxide ions, two oxide ions are included as "free oxide ions" in a space inside a cage formed by the crystal skeleton.

The present inventors found that the free oxide ions in the mayenite-type compound can be substituted with various anions. Particularly, when the mayenite-type compound is held at a high temperature under a strong reduction atmosphere, it is possible to replace all the free oxide ions with electrons. The mayenite-type compound in which the free oxide ions are substituted with electrons is a conductive mayenite-type compound having a good electronic conductivity (Non-Patent Document 2.). In addition, the mayenite-type compound in which the free oxide ions are substituted with electrons is sometimes referred to as "C12A7 electride".

The present inventors found that the catalyst using the C12A7 electride can be used as an ammonia synthesis catalyst (Patent Document 1). Specifically, an ammonia can be synthesized by contacting a nitrogen and a hydrogen with a supported metal catalyst, in which a transition metal such as Ru, Fe, Co or the like is supported on the C12A7 electride as a catalytic support. The supported metal catalyst has a higher activity for synthesizing ammonia and a higher performance in synthesizing ammonia than the conventional supported metal ammonia synthesis catalyst.

The C12A7 electride can be obtained by heating a mayenite-type compound in a reduction atmosphere. The catalyst using the C12A7 electride can be obtained by supporting a transition metal compound to be a catalytically active component onto the C12A7 electride and then subjecting it to reduction process. A method for manufacturing the conductive mayenite-type compound has also been studied (Patent Document 2). As a method of improving its specific surface area, a mayenite-type compound having fine pores has been proposed.

[Patent Document 1] International Publication WO2012/077658
[Patent Document 2] International Publication WO2014/034473
[Non-Patent Document 1] H B Bartl, T. Scheller and N. Jarhrb, Mineral Monatch. 1970, 547.
[Non-Patent Document 2] S. Matuishi, Y. Toda, M. Miyakawa, K. Hayashi, T. Kamiya, M. Hirano, I. Tanaka and H. Hosono, Science 301, 626-629 (2003).

SUMMARY OF INVENTION

The C12A7 electride is usually produced by injecting electrons into the mayenite-type compound. The step of injecting electrons into the mayenite-type compound usually requires heating at a high temperature and under a reduction atmosphere and requires handling in a sealed container or an atmosphere of an inert gas (Ar or the like). Therefore, the reaction operation becomes complicated. Particularly when the manufacturing scale becomes large, a dedicated manufacturing apparatus is required. There is concern that load of manufacturing facilities and manufacturing cost will increase.

On the other hand, injecting electrons into the mayenite-type compound requires a heat process at high temperature. Therefore, even a mayenite-type compound having micro-pores and having a large specific surface area is used, the micro-pores are destroyed when it is exposed to a high temperature condition. As a result, there is a problem that further improvement in performance cannot be achieved because the specific surface area of the C12A7 electride is lowered during production of the catalyst.

In the production of the supported metal catalyst using the C12A7 electride as a catalytic support, there are problems in terms of manufacturing methods and manufacturing facilities, in a case of trying to improve the performance of the catalyst, and especially in a case of considering manufacturing on an industrial scale. Therefore, there is a demand for a method that can produce a catalyst with a higher activity by using a more convenient method.

The present inventors conducted intensive studies to solve the above-mentioned problems, and as a result, they found that when a mayenite-type compound in which no electron is injected is used as a catalytic support, a catalyst for synthesis of ammonia having an efficient reaction activity can be obtained by a simpler production method by undergoing a certain treatment condition.

That is, the gists of the present invention are as follows.

[1] A method for manufacturing an ammonia synthesis catalyst, the method comprising: a first step of preparing $12CaO \cdot 7Al_2O_3$ having a specific surface area of 5 $m^2/g$ or more; a second step of supporting a ruthenium compound on the $12CaO \cdot 7Al_2O_3$; and a third step of performing reduction process on the $12CaO \cdot 7Al_2O_3$ on which the ruthenium compound is supported (hereinafter referred to as ruthenium-supported C12A7) obtained in the second step, wherein the reduction process is carried out until an average particle diameter of a ruthenium after the reduction process increases by 15% or more with respect to an average particle diameter of a ruthenium before the reduction process.

[2] The method for manufacturing an ammonia synthesis catalyst according to [1], wherein the specific surface area of the ruthenium-supported C12A7 after the reduction process step is 5 m$^2$/g or more.

[3] The method for manufacturing an ammonia synthesis catalyst according to [1] or [2], wherein in the first step, preparing 12CaO·7Al$_2$O$_3$ is carried out by a hydrothermal synthesis method, a sol-gel method, a combustion synthesis method or a co-precipitation method.

[4] The method for manufacturing an ammonia synthesis catalyst according to any one of [1] to [3], wherein in the second step, supporting the ruthenium compound is carried out by an impregnation method or a vapor deposition method.

[5] The method for manufacturing an ammonia synthesis catalyst according to any one of [1] to [4], wherein in the step of performing reduction process, the reduction process is carried out by using a gas containing hydrogen.

[6] The method for manufacturing an ammonia synthesis catalyst according to any one of [1] to [5], the method further comprises, following the first step, a step of molding the 12CaO·7Al$_2$O$_3$ obtained in the first step,

[7] The method for manufacturing an ammonia synthesis catalyst according to any one of [1] to [5], the method further comprises, following the second step, a step of molding the ruthenium-supported C12A7 obtained in the second step

[8] The method for manufacturing an ammonia synthesis catalyst according to any one of [1] to [7], wherein the ammonia synthesis catalyst comprises at least an alkali metal atom or an alkaline earth metal atom.

[9] A method for manufacturing ammonia, comprising: a first step of preparing 12CaO·7Al$_2$O$_3$ having a specific surface area of 5 m$^2$/g or more; a second step of supporting the ruthenium compound on the 12CaO·7Al$_2$O$_3$; a third step of performing reduction process on the 12CaO·7Al$_2$O$_3$ on which a ruthenium compound is supported (hereinafter referred to as ruthenium-supported C12A7) obtained in the second step, wherein the reduction process is carried out until an average particle diameter of a ruthenium after the reduction process increases by 15% or more with respect to the average particle diameter of a ruthenium before the reduction process; and
    a step of producing ammonia by contacting a gas containing nitrogen and hydrogen with the ammonia synthesis catalyst which is obtained by the reduction process in the third step.

[10] The method according to [9], wherein in the reduction process step, the reduction process is performed by using a gas containing hydrogen.

[11] The method according to claim [9], wherein in the reduction process step, the reduction process is performed with a gas containing hydrogen and nitrogen.

[12] The method according to any one of claims [9] to [11], wherein the ammonia synthesis catalyst comprises at least an alkali metal atom or an alkaline earth metal atom.

[13] A metal-supported material, comprising 12CaO·7Al$_2$O$_3$; and plural kinds of metal atoms supported on the 12CaO·7Al$_2$O$_3$, wherein a specific surface area of the 12CaO·7Al$_2$O$_3$ is 5 m$^2$/g or more; and the plural kinds of metal atoms comprises a metal ruthenium, and an alkali metal atom or an alkaline earth metal atom.

[14] The metal-supported material according to [13], wherein the alkali metal atom or the alkaline earth metal atom is an oxide of an alkali metal or an oxide of an alkaline earth metal.

[15] The metal-supported material according to [13] or [14], wherein the alkali metal atom or the alkaline earth metal atom is barium.

[16] A catalyst comprising the metal-supported material according to any one of claims [13] to [15].

[17] The catalyst according to claim 16, wherein the catalyst is used for ammonia synthesis.

[18] A method for manufacturing ammonia, the method comprising:
    contacting a gas containing nitrogen and hydrogen with the catalyst according to claim [16] or [17].

By using the method for manufacturing a catalyst of the present invention, a catalyst having higher performance as an ammonia synthesis catalyst can be easily produced, than a catalyst using a conventional C12A7 electride as a catalytic support. In particular, an ammonia synthesis catalyst can be provided by a production method suitable for industrial production.

By using the method for manufacturing the catalyst of the present invention, a catalyst can be produced, wherein when the catalyst is used as an ammonia synthesis catalyst, ammonia is stably produced even if the reaction is continued for a long time, and decrease in reaction activity is small. That is, since the lifetime of the obtained catalyst is long, it is advantageous in that ammonia can be produced with a high production efficiency.

DESCRIPTION OF EMBODIMENTS

A first aspect of the present invention is related to a method for manufacturing an ammonia synthesis catalyst, and the method includes prescribed producing steps described later by using 12CaO·7Al$_2$O$_3$ having a large specific surface area.

A second aspect of the present invention is related a metal-supported material having a plural kinds of metal atoms supported on 12CaO·7Al$_2$O$_3$ having a specific surface area of 5 m$^2$/g or more, wherein the metal atoms are a metal ruthenium, and an alkali metal atom or an alkali. The second aspect of the present invention is also related to an ammonia synthesis catalyst using the metal-supported material.

Hereinafter, the present invention will be described in detail.

<Mayenite-Type Compound>

The mayenite-type compound is a calcium aluminosilicate containing CaO, $Al_2O_3$ and $SiO_2$ and has a crystal structure of the same type as mayenite. The representative composition of the mayenite-type compound is represented by $12CaO \cdot 7Al_2O_3$.

The crystals of mayenite-type compounds are composed of cage-like structures (cages) which wall surfaces are shared and which are connected three-dimensionally. Usually anions such as $O^{2-}$ are contained inside the cage of the mayenite-type compound, however, the anions can be replaced with conduction electrons by chemical treatment.

The mayenite-type compound used in the present invention is hereinafter referred to as $12CaO \cdot 7Al_2O_3$ and sometimes abbreviated simply as "C12A7".

The specific surface area of $12CaO \cdot 7Al_2O_3$ used in the present invention is 5 $m^2/g$ or more. By using the $12CaO \cdot 7Al_2O_3$ having a specific surface area not less than the above range, a high catalytic activity can be obtained when it is used as an ammonia synthesis catalyst. Below the above range, a sufficient catalytic activity cannot be obtained. The specific surface area is preferably 10 $m^2/g$ or more, and more preferably 15 $m^2/g$ or more. Although the upper limit is not particularly limited, it is preferably 200 $m^2/g$ or less, more preferably 100 $m^2/g$ or less. Within the above range, it is advantageous in respect of handleability of powder of the catalyst or in respect of moldability.

The shape of $12CaO \cdot 7Al_2O_3$ used in the present invention is not particularly limited. Usually, fine particles, granular particles, bulk form and the like can be used. It is preferably to use fine particles or bulk form, more preferably to uses fine particles. When the mayenite-type compound is made into fine particles, the surface area per mass increases. The gap between the particles is not particularly limited, but is preferably within a mesoporous region of 2 nm or more and 100 nm or less.

In the case of bulk form, although not particularly limited, it is preferable that it is a porous body having a pore structure. By having a pore structure, it is possible to obtain $12CaO \cdot 7Al_2O_3$ having a higher specific surface area.

When the shape of $12CaO \cdot 7Al_2O_3$ is fine particles, its particle diameter is not particularly limited. The primary particle size is 5 nm or more, preferably 10 nm or more; and 500 nm or less, preferably 100 nm or less.

The ammonia synthesis catalyst obtained by the present invention can be obtained by supporting a catalytically active metal on a mayenite-type compound.

Ruthenium (Ru) is used as a catalytically active metal in the ammonia synthesis catalyst in the present invention. Ruthenium may be used alone or in combination with a metal element other than ruthenium.

The metal element other than ruthenium is not particularly limited as long as it does not inhibit an activity of the ammonia synthesis catalyst obtained in the present invention. It is preferable to use one or more transition metals selected from Group 3, Group 8, Group 9 or Group 10 of the periodic table, more preferably yttrium, iron or cobalt.

It is preferable to use Ru alone, from the viewpoint of obtaining stable catalytic activity. Compared with the case where two or more kinds of catalytically active metals are used, in the case where Ru alone is used, a surface composition of the catalyst is unlikely to change by changing reduction process condition or the like. Therefore, a desired ammonia synthesis activity can be easily obtained.

The amount of Ru is not particularly limited. With respect to the mass of the catalytic support C12A7, the amount of Ru is 0.01% by mass or more, preferably 0.02% by mass or more, more preferably 0.05% by mass or more; and the amount of Ru is 30 mass % or less, preferably 20 mass % or less, more preferably 10 mass % or less. Within the above range, the obtained catalyst can have sufficient active points, an efficient catalyst can be obtained, and a catalyst favorable in terms of cost can be obtained.

The ammonia synthesis catalyst obtained by the present invention may contain components other than the mayenite-type compound and the catalytically active metal as long as they do not disturb the object of the present invention.

For example, a component serving as a binder (binder) component for facilitating the molding of the catalyst can be added.

Specific examples thereof include metal oxides such as $SiO_2$, $Al_2O_3$, $ZrO_2$, $TiO_2$, $La_2O_3$, $CeO_2$, and $Nb_2O_5$; and carbon materials such as activated carbon, graphite and SiC.

The ammonia synthesis catalyst obtained by the present invention may contain an alkali metal atom or an alkaline earth metal atom as a component thereof. Since these components can function as reaction accelerators in the synthesis of ammonia when these components are present in the catalyst, it is preferable to contain these components.

The type of the alkali metal atom is not particularly limited, for example, lithium, sodium, potassium, cesium, rubidium or the like can be used.

The type of alkaline earth metal atom is not particularly limited, for example, magnesium, strontium, barium or the like can be used.

Among the above-mentioned metal atoms, a barium atom is preferable.

The form of alkali metal atoms and alkaline earth metal atoms is not particularly limited. Examples include hydroxides of each atom; inorganic acid salts such as carbonates and nitrates; carboxylates such as acetates and formates; alkoxides such as ethoxide; and other organic compounds containing each atom. The addition amount of the reaction accelerators is not particularly limited. The addition amount of the reaction accelerators is 0.01 times or more; and 50 times or less, preferably 20 times or less in terms of a molar ratio of each metal with respect to ruthenium atoms contained in the catalyst.

The adding method is not particularly limited as long as the metal atom of alkali metal atoms and alkaline earth metal atoms, which may be used as reaction accelerators, may be present in the reaction field during the ammonia synthesis reaction. Examples of a method of adding the metal may include a method of mixing the metal when preparing the mayenite-type compound in the first step to be described later and producing a mayenite-type compound containing them; a method of co-supporting the metal atom when supporting a Ru metal source in a second step to be described later; a method of adding the metal atom when molding the catalyst; and the like.

<Method for Manufacturing Ammonia Synthesis Catalyst>

The method for manufacturing an ammonia synthesis catalyst according to the first aspect of the present invention (hereinafter, the production method of the present invention) includes the following first step to third step, which will be described in this order.

<First Step: Preparing Mayenite-Type Compound ($12CaO \cdot 7Al_2O_3$)>

The production method of the present invention includes a step of preparing $12CaO \cdot 7Al_2O_3$ having a specific surface area of 5 m$^2$/g or more as a first step.

The raw material for producing $12CaO \cdot 7Al_2O_3$ having a specific surface area of 5 m$^2$/g or more is not particularly limited. Depending on the production method, various calcium-containing materials (hereinafter referred to as calcium atom sources) and aluminum-containing materials (hereinafter referred to as aluminum atom sources) may be used.

Specific examples of the calcium atom source include calcium hydroxide; calcium oxide; calcium salt such as calcium nitrate, calcium chloride, and calcium acetate; calcium alkoxide such as calcium ethoxide, calcium propoxide, calcium isopropoxide, calcium butoxide, calcium isobutoxide; and the like.

Specific examples of the aluminum atom source include aluminum hydroxide; aluminum oxide; aluminum salts such as aluminum nitrate, aluminum chloride and aluminum acetate; aluminum alkoxide such as aluminum ethoxide, aluminum propoxide, aluminum isopropoxide, aluminum butoxide and aluminum isobutoxide; aluminum acetylacetonate; and the like.

The mayenite-type compound ($12CaO \cdot 7Al_2O_3$) may contain an atom other than Ca, Al and oxygen as long as it does not disturb the object of the present invention.

Specifically, the first step of the present invention can be carried out by using an alkali metal atom or an alkaline earth metal atom used as a reaction accelerator together with the calcium atom source and the aluminum atom source.

"Containing atoms other than Ca, Al, and oxygen" means that the mayenite-type compound ($12CaO \cdot 7Al_2O_3$) contains a substance having atoms other than Ca, Al, and oxygen as constituent components. Specifically, for example, "containing an alkaline earth metal atom" means containing a simple substance of an alkaline earth metal, a salt of an alkaline earth metal, an oxide of an alkaline earth metal, a hydroxide of an alkaline earth metal, or the like.

A method of preparing $12CaO \cdot 7Al_2O_3$ having a specific surface area of 5 m$^2$/g or more is not particularly limited. For example, a hydrothermal synthesis method, a sol-gel method, a combustion synthesis method, or a co-precipitation method can be used. The hydrothermal synthesis method is preferable from the viewpoint that it is simple and capable of obtaining $12CaO \cdot 7Al_2O_3$ having a high surface area with good reproducibility.

<Hydrothermal Synthesis Method>

The hydrothermal synthesis method has been studied for a long time as a method of synthesizing fine inorganic oxide particles having good crystallinity. In particular, the method includes, firstly, obtaining a precursor compound of the inorganic oxide by placing a solvent such as water or alcohol and a raw material of an inorganic oxide in a pressure resistant container, and then heating them at a temperature equal to or higher than the boiling point of the solvent for several hours to several days; and subsequently, obtaining an inorganic oxide by further heating the resultant precursor compound.

When using a hydrothermal synthesis method, the mayenite-type compound ($12CaO \cdot 7Al_2O_3$) is produced by producing a hydroxide of $Ca_3Al_2(OH)_{12}$ as a precursor, and then heating it in a pressure vessel at a temperature equal to or higher than the boiling point of water.

The calcium atom source used in the hydrothermal synthesis method is not particularly limited. Among the above calcium atom sources, calcium hydroxide, calcium oxide, or calcium salt may be used, and preferably calcium hydroxide is used.

The aluminum atom source is not particularly limited. Among the above calcium atom sources, aluminum hydroxide, aluminum oxide, or aluminum salt may be used, and aluminum hydroxide is preferably used.

A mixing ratio of the raw materials of the precursors is not particularly limited. The mixing ratio can be appropriately adjusted according to the desired composition. The mixing ratio may be adjusted by a stoichiometric composition of targeted mayenite-type compound ($12CaO \cdot 7Al_2O_3$).

The heating temperature is not particularly limited, and the heating temperature can be appropriately selected as long as a sufficient yield can be obtained. For example, the heating temperature is 100° C. or more, preferably 150° C. or more; and 200° C. or less. Within the above-mentioned range, it is possible to carrying out the production by using a commonly-used reaction apparatus, which is advantageous from the viewpoint of apparatus.

The heating time is not particularly limited, and a heating time can be appropriately selected as long as a sufficient yield can be obtained. For example, the heating time is 2 hours or more, preferably 6 hours or more; and 100 hours or less. Within the above range, it is possible to sufficiently obtain the targeted mayenite-type compound.

$12CaO \cdot 7Al_2O_3$ having a specific surface area of 5 m$^2$/g or more can be obtained by heating and dehydrating $Ca_3Al_2(OH)_{12}$ which is the above-obtained precursor of the mayenite-type compound.

The heating condition is not particularly limited, and it can be appropriately selected within a range where C12A7 having a large specific surface area can be obtained. For example, as a heating condition, heating in the air may be used.

The heating temperature is not particularly limited, but it can be heated at 400° C. or more, preferably 450° C. or more; and 1000° C. or less.

<Sol-Gel Method>

The mayenite-type compound ($12CaO \cdot 7Al_2O_3$) can be produced by a sol-gel method. The sol-gel method includes forming a sol by hydrolyzing an organic compound or an inorganic compound of a metal which is a raw material of a desired metal oxide in a solution; then converting the sol to gel by carrying out poly-condensation; and treating the gel at high temperature to obtain a metal oxide. The production method can be carried out according to a known method described in, for example, J. Phys. D: Appl. Phys., 41, 035404 (2008) or the like.

The method for manufacturing a catalyst of the present invention, specifically, includes dissolving an aluminum atom source as a raw material in a solvent; preparing a hydrolyzed sol by adding acid after heating and stirring the mixture; next, dissolving the calcium atom source in a solvent; adjusting pH as necessary; forming a gel by stirring, heating and mixing the resulted solution containing the calcium atom source with the sol containing the aluminum atom source; dehydrating and calcining it after filtering the resulting gel to obtain the mayenite-type compound.

The calcium atom source used in the sol-gel method is not particularly limited, and for example, a calcium hydroxide, a calcium oxide, a calcium salt or the like may be used. The calcium salt is preferable. As the calcium salt, a calcium nitrate is preferable.

As the aluminum atom source, although not particularly limited, aluminum hydroxide, aluminum oxide, aluminum alkoxide or the like may be used. Aluminum alkoxide is preferable.

<Combustion Synthesis Method>

As a method for manufacturing the mayenite-type compound, it is also possible to use a combustion synthesis method. As a specific production method, the method described in J. Am. Ceram. Soc., 81, 2853-2863 (1998) may be used. For example, a mayenite-type compound can be obtained by producing an amorphous precursor of a mayenite-type compound by dissolving a calcium atom source and an aluminum atom source in water, and heating and burning the mixed solution; and then, further heating and dehydrating the amorphous precursor.

The calcium atom source and the aluminum atom source used in the combustion synthesis method are not particularly limited. For example, calcium salt and aluminum salt are preferable, and calcium nitrate and aluminum nitrate are more preferable.

Specifically, for example, $Ca(NO_3)_2 \cdot 4H_2O$ and $Al(NO_3)_3 \cdot 9H_2O$ can be used as raw materials. The raw materials may be dissolved in water in stoichiometric composition, although not particularly limited. Urea is further added to the solution in which the raw material is dissolved, and the mixed solution is heated and burned to obtain an amorphous precursor of the mayenite-type compound.

The heating temperature is not particularly limited. For example, the heating temperature may be 500° C. or higher.

The obtained amorphous precursor may be heated, not particularly limited, for example, at a temperature of 700° C. or more and 1000° C. or less and dehydrated to obtain a mayenite-type compound powder C12A7.

<Co-Precipitation Method>

A co-precipitation method is a method of simultaneously precipitating hardly-soluble salts of plural kinds of metals by using a solution containing two or more kinds of metal ions. The co-precipitation method can prepare a highly uniform powder.

The raw material used for the co-precipitation method is not particularly limited. Calcium salt may be used as the calcium atom source, and calcium nitrate is preferable. Aluminum salt may be used as the aluminum atom source, and aluminum nitrate is preferable.

Specifically, $12CaO \cdot 7Al_2O_3$ can be obtained by adding an alkali such as ammonia or sodium hydroxide to an aqueous solution containing calcium nitrate and aluminum nitrate; simultaneously precipitating a hardly-soluble salt containing calcium hydroxide and aluminum hydroxide; and then filtering, drying and calcining the precipitation.

<Second Step: Supporting Ruthenium Compound>

The production method of the present invention includes, as a second step, a step of supporting a ruthenium compound on the $12CaO \cdot 7Al_2O_3$ obtained in the first step.

The ruthenium compound is not particularly limited as long as it can be converted to a metal ruthenium to be an active ingredient of an ammonia synthesizing catalyst by a subsequent reduction process. For example, a ruthenium salt, a ruthenium complex, or the like may be used.

Examples of the ruthenium salt include ruthenium chloride ($RuCl_3$), ruthenium chloride hydrate ($RuCl_3 \cdot nH_2O$), ruthenium acetate ($Ru(CH_3CO_2)x$), ruthenium iodide hydrate ($RuI_3 \cdot nH_2O$), ruthenium nitrosylnitrate ($Ru(NO)(NO_3)_3$), nitrosyl ruthenium chloride hydrate ($Ru(NO)Cl_3 \cdot nH_2O$), ruthenium trinitrate ($Ru(NO_3)_3$), hexaammine ruthenium chloride ($Ru(NH_3)_6Cl_3$), and the like. As a ruthenium salt, ruthenium chloride is preferable from the viewpoint of obtaining high ammonia synthesizing activity without destroying the $12CaO \cdot 7Al_2O_3$ structure in the step of supporting Ru.

As the ruthenium complex, triruthenium dodecacarbonyl ($Ru_3(CO)_{12}$), dichlorotetrakis (triphenylphosphine) ruthenium (II) $RuCl_2(PPh_3)_4$), dichlorotris (triphenylphosphine) ruthenium (II) ($RuCl_2(PPh_3)_3$), tris (acetylacetonato) ruthenium (III) ($Ru(acac)_3$), ruthenocene ($Ru(C_5H_5)$), dichloro (benzene) ruthenium (II) dimer ($[RuCl_2(C_5H_5)]_2$), dichloro (mesitylene) ruthenium (II) dimer ($[RuCl_2(mesitylene)]_2$), dichloro (p-cymene) ruthenium (II) dimer ($[RuCl_2(p\text{-cymene})]_2$) carbonyl chlorohydrido tris (triphenylphosphine) ruthenium (II) ($[RuHCl(CO)(PPh_3)_3]$), tris (dipivaloylmethanato) ruthenium (III) ($[Ru(dpm)_3]$), or the like can be used.

As a ruthenium complex, from the viewpoint of obtaining high ammonia synthesizing activity, triruthenium dodecacarbonyl ($Ru_3(CO)_{12}$), tris (acetylacetonato) ruthenium (III) ($Ru(acac)_3$), or ruthenocene ($Ru(C_5H_5)$) are preferable.

Among the above ruthenium compounds, ruthenium chloride and tris (acetylacetonato) ruthenium (III) are preferable in consideration of safety in catalyst production and catalyst production cost.

$Ru_3(CO)_{12}$ may be used because ruthenium can be supported on C12A7 uniformly. However, such metal carbonyl compounds may decompose at 150° C. and generate toxic CO. Therefore, it is preferable to use tris (acetylacetonato) ruthenium (III) ($Ru(acac)_3$), ruthenocene ($Ru(C_5H_5)$), or ruthenium salt because it is advantageous in that it is easy to prepare those compounds and there is no fear of safety and hygiene.

Since these compounds are easily pyrolyzed, Ru can be supported by supporting those compounds on a catalytic support C12A7 and then precipitating the supported ruthenium compound in a metal state on a catalytic support after subjecting to heat treatment. In addition, Ru metal can be formed on the catalytic support by readily performing reduction process on the ruthenium compound with hydrogen gas under heating.

In the second step, a metal compound other than the ruthenium compound can be supported together with the ruthenium compound, wherein the metal compound is used together with the ruthenium which is used in the ammonia synthesis catalyst. As the metal compound other than the ruthenium compound, it is not particularly limited as long as it does not inhibit supporting the ruthenium compound. For example, one or more transition metal compounds selected from Group 3, Group 8, Group 9, or Group 10 of the periodic table are preferable, and yttrium, iron or a cobalt compound is more preferable. As the metal compound other than the ruthenium compound, metal salts or metal complexes of the corresponding metal species can be used. Examples of a metal salt of iron and cobalt include iron chloride ($FeCl_2$, $FeCl_3$), cobalt chloride ($CoCl_3$), iron acetate ($Fe(CH_3CO_2)_2$), iron nitrate nonahydrate ($Fe(NO_3)_3 \cdot 9H_2O$), iron oxalate hydrate ($Fe(C_2O_4) \cdot nH_2O$), iron sulfate hydrate ($FeSO_4 \cdot nH_2O$), cobalt acetate ($Co(CH_3CO_2)_2$), cobalt nitrate hexahydrate ($Co(NO_3)_2 \cdot 6H_2O$), cobalt oxalate dihydrate ($Co(C_2O_4 \cdot 2H_2O)$, cobalt sulfate hydrate ($CoSO_4 \cdot nH_2O$) and the like. Examples of a metal complex include pentacarbonyl iron ($Fe(CO)_5$), nonacarbonyl iron ($Fe_2(CO)_9$), tetracarbonyl iron iodide ($Fe(CO)_4I_2$), ferrocene ($Fe(C_5H_5)_2$), tris (acetylacetonato) iron (III) ($Fe(acac)_3$), dodecacarbonyl triiron ($Fe_3(CO)_{12}$), tris (acetylacetonato) cobalt (III) ($Co(acac)_3$), cobalt (II) acetylacetonato ($Co(acac)_2$), cobalt octacarbonyl ($Co_2(CO)_8$), cobaltocene ($Co(C_5H_5)_2$) and the like. Since these co-supported metal compounds other than the ruthenium compound are easy to be thermally decomposed, a metal other than ruthenium can be co-supported with ruthenium by supporting these compounds on a catalytic support and carrying out heat treatment to precipitate a simple transition metal on the substrate.

It is also possible to co-support alkali metal atoms or alkaline earth metal atoms used as the reaction accelerator.

The phrase "co-support an alkali metal atom or an alkaline earth metal atom" means that a substance having alkali metal atom or alkaline earth metal atom as a constituent component is supported with a ruthenium compound, wherein the substance may include a simple substance of an alkali metal atom or an alkaline earth metal atom; a metal compound such as a salt, an oxide, or a hydroxide of metal an alkali metal atom or an alkaline earth metal atom; and the like.

The substance to be co-supported is not particularly limited. A simple substance of a metal or an oxide of a metal is preferable, and an oxide of metal is more preferable from the viewpoint of high stability when it is used in a catalytic reaction.

As a kind of the co-supported atoms, alkaline earth metal atoms are preferable. Specifically, Sr and Ba are more preferable, and Ba is most preferable in that it is an element more abundantly present.

As a specific co-supported material, an oxide of an alkaline earth metal is preferable. An oxide of Ba is more preferable because Ba is not a constituent of the support C12A7 and is an oxide of an element more abundantly present.

Since an oxide of an alkaline earth metal which is supported on C12A7 is not reduced to a metal even after reduction process to be described later, the oxide of an alkaline earth metal exists on the surface of C12A7 together with the metal ruthenium after reduction process.

As the raw materials used for the above-mentioned co-supporting materials, it is not particularly limited as long as co-supported metal atoms can be supported. Examples of the raw materials include hydroxides; inorganic acid salts such as carbonates and nitrates; carboxylates such as acetates and formates; alkoxides such as ethoxide; an organic compound containing other atoms; metal complexes such as metal acetylacetonate complexes; and the like. Among them, alkoxides, metal acetylacetonate complexes, carboxylic acid salts are preferable, and alkoxides are more preferable from the viewpoint that it is easy to carry out a reaction.

The method of co-supporting the above-mentioned co-supported material is not particularly limited, and an order of supporting is also not limited. Specifically, it may be supported simultaneously with the ruthenium compound or may be carried individually. Preferably, it is preferable to support the co-supported material after supporting the ruthenium compound from the viewpoint that the co-supported material can be supported in the vicinity of the ruthenium.

The method of supporting the ruthenium compound is not particularly limited.

Examples of the methods include impregnation method, thermal decomposition method, liquid phase method, sputtering method, vapor deposition method, and the like. In the method of supporting Ru on the $12CaO \cdot 7Al_2O_3$ powder, a method of carrying out molding after supporting a ruthenium compound by any one of the above supporting methods is practically used. On the other hand, in the method of supporting Ru on the molded $12CaO \cdot 7Al_2O_3$ support, the impregnation method or the vapor deposition method is preferable in that Ru can be uniformly dispersed on a single substance. The impregnation method is more preferable in that uniform ruthenium particles can be easily formed.

Specifically, in the impregnation method, firstly, $12CaO \cdot 7Al_2O_3$ is dispersed in a solution containing a ruthenium compound. Subsequently, the solvent of the solution containing $12CaO \cdot 7Al_2O_3$ and the ruthenium compound was evaporated to dryness. And then, as a result, $12CaO \cdot 7Al_2O_3$ on which a ruthenium compound is supported (hereinafter, may be referred to as a ruthenium-supported C12A7) was obtained.

In addition, specifically, a ruthenium-supported C12A7 is obtained by physically mixing $12CaO \cdot 7Al_2O_3$ with a ruthenium compound, heating it in a vacuum atmosphere, and then depositing ruthenium on $12CaO \cdot 7Al_2O_3$ by thermally decomposing the ruthenium compound.

<Third Step: Reduction Process Step>

The production method of the present invention includes a third step of performing reduction process on the ruthenium-supported C12A7 obtained in the second step. In particular, the third step includes performing reduction process on the ruthenium compound supported on the ruthenium-supported C12A7 to metallic ruthenium to obtain a ruthenium-supported catalyst.

The reduction process in the third step of the present invention is carried out until an average particle diameter of the ruthenium after the reduction process increases by 15% or more with respect to the average particle diameter before the reduction process. The upper limit is not particularly limited but it is not more than 200%. By performing the reduction process within the above range, the ruthenium-supported C12A7 can be used as a highly active ammonia synthesis catalyst.

Here, in principle, the average particle diameter of ruthenium is the average particle diameter obtained by the chemical adsorption method described later. When it is difficult to measure by the chemical adsorption method, the average particle diameter means an average particle diameter by a direct observation method such as TEM to be described later.

The average particle diameters of the ruthenium before the reduction process and after the reduction process are determined as the ruthenium atoms present on the surface to be measured are all metallic ruthenium. A ruthenium compound which is a ruthenium atom source may be contained as long as it does not disturb the object of the present invention.

When most of the ruthenium sources are ruthenium compounds, since the particle diameters of ruthenium cannot be measured, the particle diameter of ruthenium may be obtained by performing reduction process at low temperature.

The average particle diameter of ruthenium in the ruthenium-supported catalyst after reduction process, not particularly limited, may be 2 nm or more and 15 nm or less.

The conditions of the reduction process in the third step of the present invention are not particularly limited as long as they do not disturb the object of the present invention. Examples include a method of performing the reduction process in an atmosphere containing a reduction gas, and a method of performing the reduction process in which a reduction agent such as $NaBH_4$, $NH_2NH_2$, or formalin is added to a solution containing a Ru atom source to precipitate the metal Ru on a C12A7 surface. The method of performing the reduction process in an atmosphere containing a reduction gas is preferable. Examples of the reduction gas include hydrogen, ammonia, methanol (vapor), ethanol (vapor), methane, ethane and the like.

Further, at the time of the reduction process, components other than the reduction gas may coexist in the reaction system. In particular, at the time of the reduction process, in addition to the reduction gas such as hydrogen, a gas such as argon or nitrogen which does not inhibit the reaction may coexist. It is preferable to coexist with nitrogen.

When the reduction process is carried out in a gas containing hydrogen, by allowing nitrogen to coexist with hydrogen, the third step can be carried out in parallel with ammonia synthesis to be described later.

The temperature of the reduction process in the third step of the present invention is not particularly limited. For example, the temperature of the reduction process is 200° C. or more, preferably 300° C. or more; and 1000° C. or less, preferably 600° C. or less. Within the above temperature range, the growth of the ruthenium particles occurs sufficiently by carrying out reduction process within a preferable range. In addition, by performing the reduction process, in an ammonia synthesis reaction, both the activation energy and the dependence of the reaction rate on the partial pressure of hydrogen and nitrogen are almost the same as those of the high active Ru/C12A7 electride.

In the present invention, the pressure of the reduction process is not particularly limited. For example, the pressure of the reduction process is 0.01 MPa or more, and 10 MPa or less. When the pressure during the reduction process is set to the same condition as the ammonia synthesis condition described later, complicated operations are unnecessary, which is advantageous in terms of production efficiency.

In the present invention, the time of the reduction process is not particularly limited. When the reduction process is carried out at normal pressure, the time of the reduction process is 20 hours or more, preferably 25 hours or more. When the reaction pressure is high, for example, 1 MPa or more, the time of the reduction process is preferably 5 hours or more.

The substance in which ruthenium is supported on C12A7, which is obtained after the reduction process, can be used as a catalyst having ammonia synthesizing activity (hereinafter sometimes simply referred to as "catalyst").

The BET specific surface area of the catalyst obtained by the production method of the present invention is not particularly limited. For example, the BET specific surface area is 5 m$^2$/g or more, preferably 10 m$^2$/g or more; and 200 m$^2$/g or less, preferably 100 m$^2$/g or less.

The specific surface area of ruthenium-supported C12A7 obtained after the reduction process is about the same as that of C12A7 on which no ruthenium is supported and which is used as a raw material for production of the ruthenium-supported C12A7.

The catalyst obtained by the production method of the present invention can be appropriately used as a molded body by using a conventional molding technique. Specific examples thereof include granular, spherical, tablet-like, ring-shaped, macaroni-like, four-leaf shaped, dice-shaped, honeycomb-shaped, and the like. The support can also be used after coating a metal-supported catalyst.

The step of molding the catalyst is carried out at any step of the production method of the present invention, and there is no limitation. Molding may be carried out following any one of the steps of production method of the present invention.

Specifically, the production method of the present invention may include, for example, after the first step, a step of molding the 12CaO·7Al$_2$O obtained in the first step.

Further, the production method of the present invention may include, after the second step, a step of molding the ruthenium-supported C12A7 obtained in the second step.

In addition, the production method of the present invention may include, after the third step, a step of molding the catalyst obtained in the third step.

Among them, a method of including a molding step after the first step or after the second step is preferable, in which Ru is uniformly dispersed on a support and high ammonia synthesis activity is obtained.

Further, when an alkali metal atom or an alkaline earth metal atom used as the above-mentioned reaction accelerator, those metal atoms may be added during molding and then the step of molding is carried out. Those metal atoms may also be adding to a surface of a catalyst after molding.

By using the production method according to the first aspect of the present invention, a metal-supported material is obtained. The metal-supported material is a material in which plural kinds of metal atoms are supported on 12CaO·7Al$_2$O$_3$, wherein 12CaO·7Al$_2$O$_3$ has a specific surface area of 5 m$^2$/g or more, and the metal atoms include a metal ruthenium, and an alkali metal atom or an alkaline earth metal atom.

The metal-supported material has very high activity, particularly when used as a catalyst in an ammonia synthesis reaction. The metal-supported material is a very useful material as an ammonia synthesis catalyst. Without injecting electrons into C12A7, it is also possible to obtain a catalyst having an activity equal to or higher than that made of the C12A7 electride.

Hereinafter, the metal-supported material of the second embodiment of the present invention (hereinafter referred to as the metal-supported material of the present invention) and the ammonia synthesis catalyst using the same will be described.

Specifically, the metal-supported material of the present invention is a metal-supported material in which 12CaO·7Al$_2$O$_3$ having a specific surface area of 5 m$^2$/g or more is used as a catalytic support, and a metal ruthenium as well as an alkali metal atom or alkaline earth metal atom are supported on the catalytic support. Preferably, an alkaline earth metal atom is supported, more preferably, a Sr or Ba atom is supported, and most preferably, a Ba atom is supported.

When an alkali metal atom or an alkaline earth metal atom is supported, although it is not particularly limited, it is preferable that oxides of each atom be supported from the viewpoint of high stability when used as a catalyst in the reaction.

Specifically, it is preferable that on C12A7 having a specific surface area of 5 m$^2$/g or more, a metal ruthenium and an alkaline earth metal oxide are co-supported. It is more preferable that a metal ruthenium and an oxide of Ba are co-supported because Ba is not a constituent of C12A7 and the oxide of Ba present abundantly on the earth.

The method for manufacturing the metal-supported material of the present invention is not limited as long as the effect is obtained. It is preferable to produce it by the production method according to the first aspect of the present invention. When the production method of the present invention is used, the specific production method, reaction conditions and the like are the same as described above.

The metal-supported material of the present invention can be used as a catalyst, particularly as an ammonia synthesis catalyst. The catalyst containing the metal-supported material of the present invention or the catalyst for synthesizing ammonia is preferable in terms of high reaction activity. Specifically, as compared with a catalysis without an alkali metal atom or alkaline earth metal atom, the catalyst is preferable because ammonia can be efficiently produced at a lower temperature.

<Production Method of Ammonia>

The catalyst obtained by the production method of the present invention and the catalyst containing the metal-supported material of the present invention can be used for ammonia synthesis reaction to produce ammonia.

Specifically, the method for manufacturing ammonia may include, following the first step to the third step in the above-mentioned method for manufacturing an ammonia synthesis catalyst, a fourth step of contacting a gas containing hydrogen and nitrogen with the obtained catalyst.

As a method for manufacturing ammonia, it is possible to produce ammonia by supplying only hydrogen in the third step of the method for manufacturing the ammonia synthesis catalyst, and then, after a highly active catalyst is obtained, supplying nitrogen together with hydrogen. It is also possible to produce ammonia by supplying a mixed gas containing hydrogen and nitrogen from the beginning, and then continuously carrying out the reduction process of the catalyst. Further, unreacted gas recovered from the reactor at this time can be used by recycling to the reactor.

The method for manufacturing ammonia of the present invention is not particularly limited. When a gas containing hydrogen and nitrogen is contacted with a catalyst, ammonia may be produced by heating the catalysis.

The reaction temperature is not particularly limited. For example, the reaction temperature is 200° C. or more, preferably 250° C. or more; and 600° C. or less, preferably 500° C. or less. Since ammonia synthesis is an exothermic reaction, the low temperature region is more favorable for ammonia formation on a chemical equilibrium theory. However, in order to obtain a sufficient ammonia formation rate, the above temperature range is preferable.

A molar ratio of nitrogen and hydrogen to be contacted with the catalyst is not particularly limited. For example, the molar ratio of hydrogen to nitrogen ($H_2/N_2$ (volume/volume)) is 1 or more and 10 or less, preferably 5 or less.

A reaction pressure in carrying out the ammonia synthesis reaction of the present invention is not particularly limited. The reaction pressure is 0.01 MPa or more, preferably 0.1 MPa or more; and 20 MPa or less, under the pressure of a mixed gas containing nitrogen and hydrogen.

It is preferable to remove moisture and an oxide adhering to the catalyst by using hydrogen gas or the like before supplying a mixed gas containing nitrogen and hydrogen. As a removal method, a reduction process may be used. Although the catalyst is stable to moisture, in order to obtain a better ammonia yield, not particularly limited, it is preferable that a total moisture content in the mixed gas of nitrogen and hydrogen is 100 ppm or less, preferably 50 ppm or less.

The form of the reaction vessel is not particularly limited. A reaction vessel which can be generally used for an ammonia synthesis reaction can be used. Examples of specific reaction forms include batch reaction type, closed circulation reaction type, flow reaction type and the like. From the viewpoint of practical use, the flow reaction type is preferable. Any one of a method using one type of reactor packed with a catalyst, a method using a plurality of reactors connecting each other, and a method using a reactor having a plurality of reaction layers in the same reactor may be used.

The ammonia synthesis reaction from hydrogen and nitrogen mixed gas is a volumetric shrinkage type exothermic reaction. Therefore, in order to raise the ammonia yield, it is possible to use a reaction apparatus used industrially for removing reaction heat. Specifically, for example, a method in which a plurality of reactors filled with catalysts are connected in series and intercoolers are installed at the outlet of each reactor in order to remove heat, or the like may be used.

In the method for manufacturing ammonia of the present invention, the ammonia synthesis catalyst obtained by the production method of the present invention may be used alone, or used in combination with other known catalysts usually usable for ammonia synthesis.

EXAMPLE

Hereinafter, the present invention will be described in more detail based on examples.

(BET Specific Surface Area Analysis)

In the following Examples and Comparative Examples, the measurement of the BET specific surface area was carried out by adsorbing nitrogen gas at the liquid nitrogen temperature on the surface of the object and measuring the amount of nitrogen mono-molecularly adsorbed. The analysis conditions are as follows.

[Measurement Condition]

Apparatus: BELSORP-mini II manufactured by Microtrac Bell Inc.

Adsorbed gas: nitrogen 99.99995 vol. %

Adsorption temperature: Liquid nitrogen temperature −196° C.

(Measurement of Ru Average Particle Diameter)

Measurement of the average particle size of Ru includes a chemical adsorption method using CO and a direct observation method using an electron microscope. The average particle diameter of Ru in the present invention is usually determined by a chemical adsorption method. If measurement by adsorption method is difficult, it is obtained by the direct observation method.

<Chemical Adsorption Method>

The number of metal atoms exposed on the surface is estimated from the adsorbed amount of CO adsorbed, and the metal surface area (Am) per mass of the supported metal is obtained. The metal surface area is represented by the following general formula (1).

Between the metal surface area (Am) and the average particle diameter (d) of the supported metal nanoparticles, the relationship expressed by the following general formula (1) holds. Therefore, an average particle diameter of the supported Ru can be obtained from the metal surface area (Am) based on the general formula (2).

$$Am=(V_{chem}\times(SF/22414)\times6.02\times10^{23}\times\sigma_m\times10^{-18})/c \quad (1)$$

$V_{chem}$: CO adsorption amount ($cm^3$)
SF (stoichiometric factor): CO/Ru=1
$\sigma_m$: metal cross-sectional area of one atom ($nm^2$)
c: mass of metal-supported on sample (g)

$$Am=4\pi(d/2)^2\times(\alpha/c) \quad (2)$$

d: average particle diameter of metal nanoparticles (m)
α: number of metal particles
c: mass of metal-supported on sample (g)

[Measurement Condition]

Apparatus: BELCAT-A manufactured by Microtrac Bell Co.

Adsorbed gas: CO/He mixed gas CO concentration 9.5 vol. %

Adsorption temperature: 50° C.

In measurement by the chemical adsorption method, the measurement sample is measured after performing the following pretreatment.

«Sample Pretreatment Condition»

The measurement sample was heated for 20 minutes from a room temperature to 400° C. under a He gas flow and then kept at 400° C. for 30 minutes under a hydrogen gas flow and then left at 400° C. for 15 minutes under a He gas flow and then cooled until 50° C.

<Direct Observation Method>

Metal nanoparticles were observed with an electron microscope such as TEM. Sizes of one hundred or more metal nanoparticles were measured, and then an average value is obtained.

[Measurement Condition]

Apparatus: JEOL-ARM 200 F manufactured by JASCO Corporation

Acceleration voltage: 200 kV (Activation Energy Measurement)

Activation Energy is an energy required to excite the starting material of the reaction from the ground state to the transition state. If the energy is lower, it shows that the reaction is easy. Activation Energy can be obtained by measuring temperature dependence of the reaction rate and calculating the slope when plotting the natural log of reaction rate against the reciprocal of the temperature.

Evaluation of the ammonia synthesis catalyst of the present invention was carried out by evaluating ammonia synthesis activity based on the ammonia synthesis rate which was calculated by using the amount of $NH_3$ produced using the ammonia synthesis catalyst of the present invention. The amount of $NH_3$ was measured by dissolving $NH_3$ produced in an aqueous solution of sulfuric acid and determining the dissolved solution by an ion chromatography.

(Ion Chromatographic Analysis)

The amounts of ammonia produced in the following Examples and Comparative Examples were determined by dissolving the produced ammonia gas in a 0.05 M sulfuric acid aqueous solution and determining the dissolved solution by an ion chromatographic analysis using an absolute calibration curve method.

[Measurement Condition]

Apparatus: HPLC Prominence manufactured by Shimadzu Corporation

Column: Shim-pack IC-C4 manufactured by Shimadzu Corporation

Length: 150 mm, inner diameter 4.6 mm

Eluent: A mixed aqueous solution of oxalic acid (3 mM), 18-crown-6-ether (2.0 mM)

Column temperature: 40° C.

Flow rate: 1.0 mL/min

Example 1

<Synthesis of Mayenite-Type Compound>

$Ca(OH)_2$ and $Al(OH)_3$ were weighed and mixed to obtain a mixed powder so that the molar ratio of Ca atom to Al atom is Ca:Al=12:14. Distilled water was added to the mixed powder so that the amount of the mixed powder was 10 mass %. And a mixed solution having a total mass of 160 g was obtained. Thereafter, this mixed solution was stirred and mixed in a planetary ball mill at room temperature for 4 hours. The obtained mixed solution was placed in a pressure-resistant closed vessel while stirring, and was heated (hydrothermal treatment) at 150° C. for 6 hours.

About 20 g of a precursor powder of mayenite-type compound: $Ca_3Al_2(OH)_{12}$ was obtained by filtering off, drying and pulverizing the precipitate obtained in the hydrothermal treatment. A powder of mayenite-type compound (hereinafter referred to as HT-C12A7) was obtained by heating and dehydrating the precursor powder in the air at 600° C. for 5 hours. The obtained mayenite-type compound is a compound having a large specific surface area. The specific surface area of the mayenite-type compound is 50 to 60 m²/g.

<Supporting Ruthenium Compound on Mayenite-Type Compound>

1 g of the HT-C12A7 powder synthesized according to the above method, and 0.042 g of $Ru_3(CO)_{12}$ were placed in a Pyrex (registered trademark) glass tube and vacuum-sealed.

HT-C12A7 powder supporting 2 mass % of Ru (hereinafter referred to as Ru/HT-C12A7) was obtained by rotating the vacuum-sealed glass tube in an electric furnace and heating the glass tube according to the following temperature program.

[Temperature Program]

(1) Temperature was raised from room temperature to 40° C. for 20 minutes, and then maintained at 40° C. for 60 minutes;

(2) After (1), after the temperature was raised from 40° C. to 70° C. for 120 minutes, and then maintained at 70° C. for 60 minutes;

(3) After (2), after the temperature was raised from 70° C. to 120° C. for 120 minutes, and then maintained at 120° C. for 60 minutes;

(4) After (3), after the temperature was raised from 120° C. to 250° C. for 150 minutes and then maintained at 250° C. for 120 minutes.

<Reduction Process and Subsequent Ammonia Synthesis Reaction>

A reaction of producing ammonia gas ($NH_3$) was carried out by reacting nitrogen gas ($N_2$) and hydrogen gas ($H_2$).

0.1 g of Ru/HT-C12A7, as a catalyst, obtained in above step was packed in a quartz glass tube and placed to a fixed-bed flow reactor to conduct a reaction. Reaction was carried out under a condition that a flow rate of the gas was set to $N_2$: 15 mL/min, $H_2$: 45 mL/min and a total of 60 mL/min; a reaction pressure was set to atmospheric pressure; and a reaction temperature was set to 400° C. The gas from the above reactor was bubbled through a 0.005 M sulfuric acid aqueous solution, and the generated ammonia was dissolved in the solution. The yielded ammonium ion was quantified by ion chromatography. The results are shown in Table 1 and FIG. 1.

Figure 1:
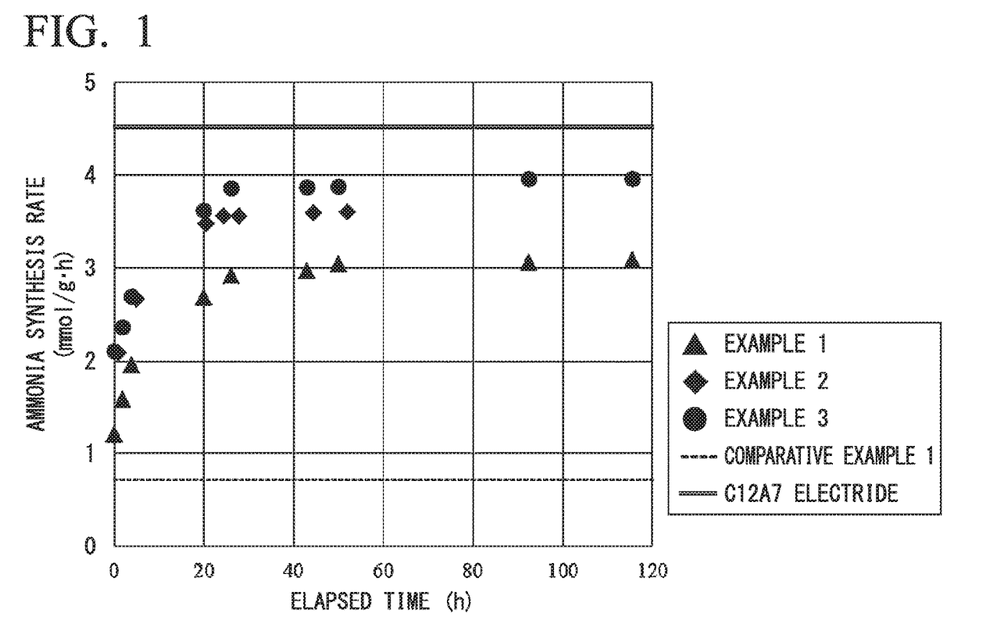
FIG. 1 is a graph showing results of reactions for ammonia synthesis using the ammonia synthesis catalysts described in Examples 1 to 3.

As shown in FIG. 1, the catalyst activity greatly improved with the reaction time.

As shown in Table 1, the initial synthesis rate of ammonia at 400° C. was 1.2 mmol/g·h. The ammonia synthesis rate was 2.9 mmol/g·h after about 24 hours reaction.

The average particle diameter of Ru determined by the chemical adsorption method described above was 7.2 nm before the reaction and 9.0 nm after the reaction. By the reduction process, the average particle diameter of Ru grew larger. After that, although the reaction time was prolonged, no decrease in catalytic activity was observed.

Example 2

5 mass % Ru/HT-C12A7 was prepared in the same manner as in Example 1 except that the amount of Ru supported was 5 mass % was used. The obtained material was used as an ammonia synthesis catalyst reaction under the same conditions as in Example 1. Ammonia was synthesized under the same conditions as in Example 1. The results are shown in Table 1 and FIG. 1.

As shown in FIG. 1, a catalyst activity was greatly improved with the reaction time.

Also, as shown in Table 1, an initial synthesis rate of ammonia at 400° C. was 2.1 mmol/g·h, and the ammonia formation rate after about 24 hours reaction was 3.6 mmol/g·h.

The average particle diameter of Ru determined by the chemical adsorption method described above was 8.9 nm before the reaction and was 12.6 nm after the reaction. By the reduction process, the average particle diameter of Ru grew larger.

After that, although the reaction time was prolonged, no decrease in catalytic activity was observed.

Example 3

10 mass % Ru/HT-C12A7 was prepared in the same manner as in Example 1 except that the amount of Ru supported was 10 mass % was used. The obtained material was used as an ammonia synthesis catalyst reaction under the same conditions as in Example 1. Ammonia was synthesized under the same conditions as in Example 1. The results are shown in Table 1 and FIG. 1.

As shown in FIG. 1, a catalyst activity was greatly improved with the reaction time.

Also, as shown in Table 1, an initial synthesis rate of ammonia at 400° C. was 2.1 mmol/g·h, and the ammonia formation rate after about 24 hours reaction was 3.9 mmol/g·h.

The average particle diameter of Ru determined by the chemical adsorption method described above was 10.7 nm before the reaction and was 14.0 nm after the reaction. By the reduction process, the average particle diameter of Ru grew larger.

After that, although the reaction time was prolonged, no decrease in catalytic activity was observed.

Example 3A

<Pressure Dependence of Ammonia Synthesis Reaction>

Figure 2:
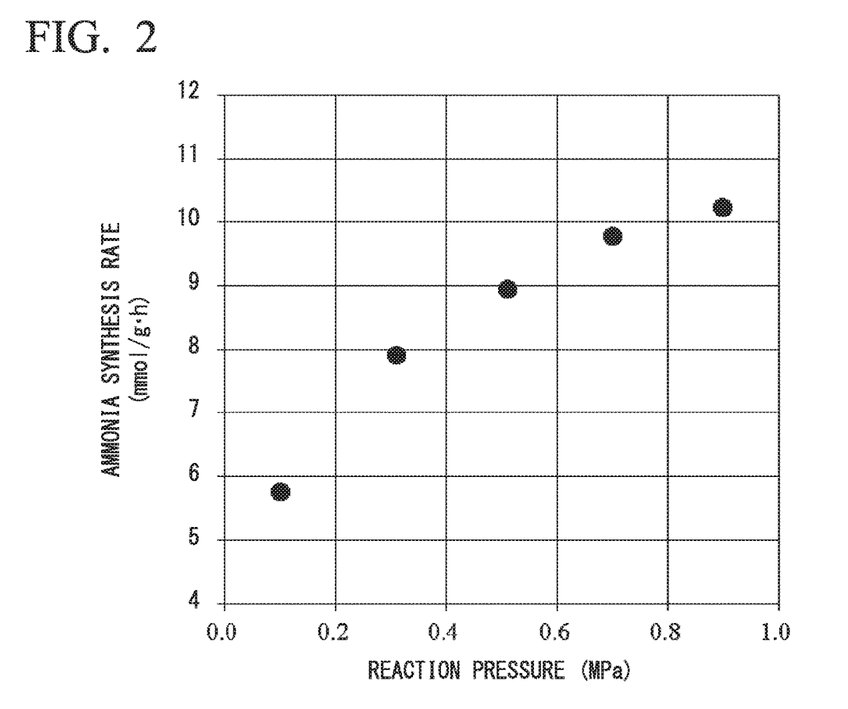
FIG. 2 is a graph showing an investigation result (Example 3A) of a change in pressure of an ammonia synthesis reaction when the ammonia synthesis catalyst described in Example 3 was used.

The pressure dependence of ammonia synthesis reaction was investigated by observing a change in catalytic activity by increasing the reaction pressure when the catalyst used in Example 3 was used and the reaction temperature (400° C.) was maintained constant. The reactions were carried out in the same manner as in Example 3 except for the reaction temperature and the reaction pressure. The results are shown in FIG. 2. The ammonia synthesis rate at each reaction pressure was obtained by continuing the reaction until the measured value of the activity became stable, and using the measured values at the stable state. The time to the above stable state was from 1 hour to 2 hours.

As shown in FIG. 2, the catalytic activity of the 10 mass % Ru/HT-C12A7 catalyst was greatly improved as the reaction pressure increases. The ammonia synthesis rate under the condition of pressure of 0.9 MPa was 10 mmol/g·h. The result shows that hydrogen poisoning did not occur as the same as C12A7 electride supporting Ru.

Comparative Example 1

C12A7 powder was obtained by mixing $CaCO_3$ powder and $Al_2O_3$ powder so that the ratio of Ca to Al is 12:7, and heating the mixed powder in an alumina crucible at 1300° C. for 6 hours by a solid phase method. A 2 mass % Ru-supported C12A7 catalyst was synthesized by supporting Ru on the obtained C12A7 powder in the same manner as in Example 1. The specific surface area of the 2 mass % Ru/C12A7 catalyst was 1 $m^2$/g.

The ammonia synthesis activity of the catalyst at 400° C. was $7.2 \times 10^{-1}$ mmol/g·h. As the reaction time elapsed, a remarkable improvement in catalyst activity was not observed.

Comparative Example 2

5 mass % Fe/HT-C12A7 catalyst was prepared in the same manner as in Example 2 except that 5 mass % of Fe was supported instead of Ru. An ammonia synthesis reaction was carried out under the same conditions as in Example 1.

As shown in Table 2, the initial synthesis rate of ammonia at 400° C. was $1.6 \times 10^{-1}$ mmol/g·h. The ammonia formation rate after the reaction for 24 hours was $1.5 \times 10^{-1}$ mmol/g·h. When Fe was supported as a catalyst, unlike in the case of Ru, no improvement in catalytic activity was observed.

Comparative Example 3

5 mass % Co/HT-C12A7 catalyst was prepared in the same manner as in Example 2 except that 5 mass % of Co was supported instead of Ru. An ammonia synthesis reaction was carried out under the same conditions as in Example 1.

As shown in Table 2, the initial synthesis rate of ammonia at 400° C. was 0 mmol/g·h. The ammonia formation rate after the reaction for 24 hours was 0 mmol/g·h. When Co was supported as a catalyst, unlike in the case of Ru, no improvement in catalytic activity was observed.

Example 4

<Supporting Ru on Mayenite-Type Compound>

$RuCl_3$ was impregnated and supported on the surface of HT-C12A7 by weighing 1.0 g of the above-mentioned HT-C12A7, which was synthesized in the same manner as in Example 1, and 0.05 g of $RuCl_3 \cdot xH_2O$ (manufactured by Aldrich, 99.9%) so that an amount of Ru supported was 2 mass %, adding the mixture to ethanol (manufactured by Kanto Chemical Co., Ltd., 99.5%), stirring it, and then removing the solvent under reduced pressure at 40° C. using a rotary evaporator. Since the supported Ru existed as a form of $RuCl_3$ rather than metal Ru after supporting $RuCl_3$, it is impossible to measure a particle diameter. Therefore, a preliminary hydrogen reduction process was carried out at 250° C. in order to measure the Ru particle diameter. As a result, 2 mass % Ru-loaded HT-C12A7 was obtained by performing the reduction process for 6 hours at 250° C. using 20 volume % hydrogen gas/nitrogen gas.

At this time, the average particle diameter of Ru was measured by TEM and found to be 1.8 nm.

Figure 3:
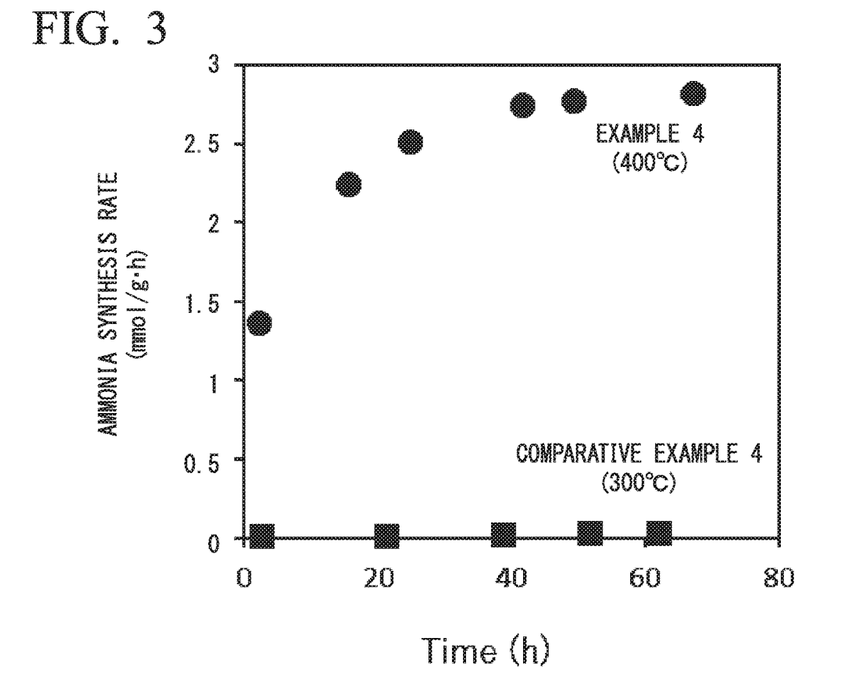
FIG. 3 is a graph showing the results of ammonia synthesis reactions using the ammonia synthesis catalysts described in Example 4 and Comparative Example 4.

An Ammonia synthesis reaction was carried out under the same conditions as in Example 1 using 2 mass % Ru-loaded HT-C12A7. As shown in FIG. 3, the catalyst activity was greatly improved with the reaction time. As shown in Table 1, the ammonia synthesis rate at the second hour at 400° C. was $1.4 \times 10^{-1}$ mmol/g·h. The ammonia formation rate after 50 hours reaction, was 2.8 mmol/g·h. After that, the temperature was lowered to 320° C. and the ammonia synthesis activity was investigated, and it was $4.0 \times 10^{-1}$ mmol/g·h. An activation energy Ea was 57 kJ/mol. The ammonia synthesis rate at 300° C., which was estimated from the activation energy, was $3.0 \times 10^{-1}$ mmol/g·h.

At this time, the average particle diameter of Ru grew to 2.2 nm after the reaction and the average particle diameter grew larger.

After that, although the reaction time was prolonged, no decrease in the catalytic activity was observed.

Comparative Example 4

By using the same catalyst as in Example 4, an ammonia synthesis reaction was carried out in the same manner as in Example 4 except that the reaction temperature of ammonia formation reaction was 300° C. As shown in FIG. 3, the ammonia synthesis rate at the second hour at 300° C. was $1.3 \times 10^{-2}$ mmol/g·h. The ammonia formation rate after 50 hours reaction was $3.5 \times 10^{-2}$ mmol/g·h. Almost no increase in activity was observed.

At this time, the average particle diameter of Ru was 1.9 nm after the reaction.

Comparative Example 5

2 mass % Ru-supported HT-C12A7 catalyst was prepared in the same manner as in Example 4, except that the pretreatment of the catalyst before the reaction was heated at 400° C. for 6 hours in an oxygen atmosphere. An ammonia synthesis reaction was carried out under the same conditions as in Example 1.

The initial formation rate of ammonia at 400° C. was $5.2 \times 10^{-1}$ mmol/g·h. The catalyst activity was improved with the reaction time, and the ammonia synthesis rate after about 24 hours the reaction was 2.0 mmol/g·h. After that, the reaction time was prolonged, however, no further improvement in catalytic activity was observed.

same manner as in Example 1, Ru was supported and ammonia synthesis was carried out.

Figure 4:
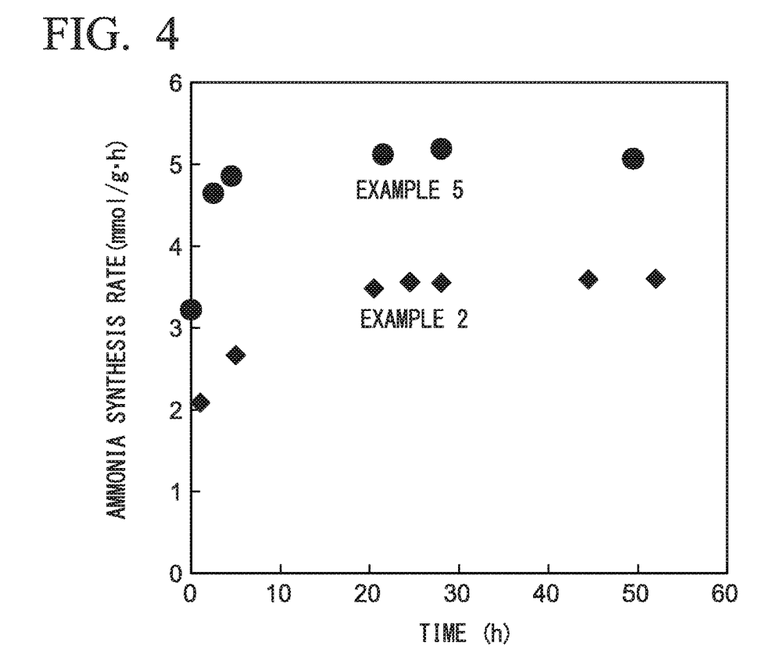
FIG. 4 is a graph showing the results of ammonia synthesis reactions using the ammonia synthesis catalysts described in Example 2 and Example 5.

As shown in FIG. 4, the catalyst activity greatly improved with the reaction time, and the ammonia synthesis rate after about 20 hours reaction was 5.1 mmol/g·h. The average particle diameter of Ru determined by the CO adsorption method was 9.6 nm before the reaction, and after the reaction, the average particle diameter of Ru grew larger to 13.7 nm.

After that, although the reaction time was prolonged, no decrease in catalytic activity was observed.

As shown in Examples 1 to 5, the HT-C12A7 supporting Ru has a greatly improved catalytic activity during the ammonia synthesis reaction and shows an ammonia synthesis rate comparable to the Ru/C12A7 electride. FIG. 1 shows the relationship between Examples 1 to 3 and Comparative Example 2, and 2 mass % Ru-supported C12A7 electride (obtained according to the description of Comparative Example 3 in WO2014/034473). Then, before and after the ammonia synthesis reaction, growth of Ru particles of the used catalyst was observed. Therefore, it is expected that Ru particles were strongly immobilized on the support C12A7 while growing Ru particles during the reaction. At this time, $O^{2-}$ ions near interface between Ru nanoparticles and the C12A7 cages were released by the catalytic action of Ru. As a result, it is considered that electrons were formed in the cage and the catalytic activity was greatly improved. In fact, the Ru/HT-C12A7 catalyst with improved activity showed about 0.5 order for $N_2$ and about 0.9 order for $H_2$. In the Ru/C12A7 catalyst which did not contain electrons and was synthesized by the solid phase method of Comparative

TABLE 1

| | Catalyst Metal | Supported amount (mass %) | Catalytic Support | NH$_3$ synthesis rate (mmol/g · h) | | Ru particle diameter (nm) | |
|---|---|---|---|---|---|---|---|
| | | | | Initial (processing time) | After reaction (reaction time) | Initial | After reaction (reaction time) |
| Example 1 | Ru | 2 | HT-C12A7 | 1.2 (1 hr) | 2.9 (24 hr) | 7.2 | 9.0 (24 hr) |
| Example 2 | Ru | 5 | HT-C12A7 | 2.1 (1 hr) | 3.6 (24 hr) | 8.9 | 12.6 (24 hr) |
| Example 3 | Ru | 10 | HT-C12A7 | 2.1 (1 hr) | 3.9 (24 hr) | 10.7 | 14.0 (24 hr) |
| Example 4 | Ru | 2 | HT-C12A7 | $1.4 \times 10^{-1}$ (2 hr) | 2.8 (50 hr) | 1.8 | 2.2 (50 hr) |
| Comparative Example 1 | Ru | 2 | Solid-phase method-C12A7 | $7.2 \times 10^{-1}$ (1 hr) | $7.2 \times 10^{-1}$ (24 hr) | 34.9 | 34.9 (24 hr) |

TABLE 2

| | Catalyst metal | Supported amount (mass %) | Catalytic Support | NH$_3$ Synthesis Rate (mmol/g · h) | |
|---|---|---|---|---|---|
| | | | | Initial (processing time) | After reaction (reaction time) |
| Example 2 | Ru | 5 | HT-C12A7 | 2.1 (1 hr) | 3.6 (24 hr) |
| Comparative Example 2 | Fe | 5 | HT-C12A7 | $1.6 \times 10^{-1}$ (1 hr) | $1.5 \times 10^{-1}$ (24 hr) |
| Comparative Example 3 | Co | 5 | HT-C12A7 | 0 (1 hr) | 0 (24 hr) |

Example 5

A mayenite-type compound was synthesized except that the Ca(OH)$_2$, Al(OH)$_2$, and Ba(OH)$_2$ were weighed and mixed so as to have Ca:Al:Ba=11.75:14:0.25. Further, in the Example 4, the order of reaction is about 1.0 order for $N_2$ and 0 order for $H_2$. For Ru/C12A7 electride, the order of reaction is about 0.5 order for $N_2$ and 1.0 order for $H_2$. These results revealed that the Ru/HT-C12A7 catalyst has ammonia synthesizing activity with almost the same mechanism as that of Ru/C12A7 electride.

In addition, when the catalyst in which $RuCl_3·xH_2O$ as a Ru source was supported on HT-C12A7 was used, the same phenomenon occurred as the case where $Ru_3(CO)_{12}$ was used as the Ru source. The catalyst activity may be greatly improved during the reaction.

Example 6

<Synthesis of Ru/HT-C12A7 in which Ba was Added>

35.5 mg of barium diethoxide $(Ba(OC_2H_5)_2$: manufactured by Wako Pure Chemical Industries, purity 99.5%) was dissolved in 45 mL of ethanol and stirred for about 20 minutes. Next, 11.3 mg of water and 5 mL of ethanol were added to the solution, and the mixture was further stirred for about 15 minutes to prepare a mixed solution. 0.3 g of Ru/HT-C12A7 described in Example 2 was added to the obtained mixed solution, and the mixture was stirred for about 20 minutes. Ru/HT-C12A7 powder (Ru:Ba=1:1 (molar ratio)) in which Ba was added (hereinafter referred to as Ba—Ru/HT-C12A7) was obtained by removing the solvent from the mixed solution using a rotary evaporator and drying the product.

The metal-supported material, Ba—Ru/HT-C12A7 was as a catalyst. The catalyst was contacted with a mixed gas of nitrogen and hydrogen, and an ammonia synthesis reaction was carried out. The ammonia synthesis reaction was carried out in the same manner as in Example 1 except that the reaction temperature was 340° C. The results are shown in Table 3.

As shown in Table 3, the ammonia synthesis rate after 30 hours reaction at 340° C. was 4.7 mmol/g·h. The initial synthesis rate of ammonia at 400° C. was 4.4 mmol/g·h, and the ammonia synthesis rate after 30 hours reaction at 400° C. was 6.9 mmol/g·h.

The average particle diameter of Ru obtained by the direct observation method of TEM was 1.6 nm before the reaction and was 2.2 nm after the reaction. The average particle diameter of Ru grew greatly by the reduction process.

After that, although the reaction time was prolonged, no decrease in catalytic activity was observed.

Example 7

$Ba(C_5H_7O_2)_2·xH_2O$ (Aldrich purity: 98%) 47.6 mg was dissolved in 100 mL of ethanol and was stirred for about 20 minutes. Ru/HT-C12A7 powder in which Ba was added (Ru:Ba=1:1 (molar ratio)) was prepared in the same manner as in Example 6 except that Ru/HT-C12A7 0.3 g was added to this solution.

Ammonia synthesis reaction was carried out under the same conditions as in Example 6, except that the metal-supported material was used as a catalyst, and the results are shown in Table 3.

As shown in Table 3, the ammonia formation rate after 30 hours reaction at 340° C. was 3.1 mmol/g·h. The initial production rate of ammonia at 400° C. was 4.3 mmol/g·h, and the ammonia formation rate after 30 hours reaction at 400° C. was 6.8 mmol/g·h.

The average particle diameter of Ru was the same as in Example 6, and the average particle diameter of Ru grew greatly due to the reduction process.

After that, although the reaction time was prolonged, no decrease in catalytic activity was observed.

Example 8

Ba—Ru/HT-C12A7 powder was obtained in the same manner as in Example 7 except that tetrahydrofuran (THF) was used in place of ethanol among the materials used in Example 7.

Ammonia synthesis reaction was carried out under the same conditions as in Example 6 except that the Ba—Ru/HT-C12A7 was used as a catalyst, and the results are shown in Table 3.

As shown in Table 3, the ammonia formation rate after 30 hours reaction at 340° C. was 2.7 mmol/g·h. The initial production rate of ammonia at 400° C. was 4.0 mmol/g·h, and the ammonia formation rate after 30 hours reaction at 400° C. was 5.9 mmol/g·h.

The average particle diameter of Ru was the same as in Example 6, and the average particle diameter of Ru grew greatly due to the reduction process.

After that, although the reaction time was prolonged, no decrease in catalytic activity was observed.

Example 9

Ba—Ru/HT-C12A7 powder (Ru:Ba=1:2 (molar ratio)) was obtained in the same manner as in Example 6 except that 271.1 mg of $Ba(OC_2H_5)_2$ and 22.5 mg of water were used.

Ammonia synthesis reaction was carried out under the same conditions as in Example 6 except that the Ba—Ru/HT-C12A7 was used as a catalyst, and the results are shown in Table 3.

As shown in Table 3, the ammonia formation rate after 30 hours reaction at 340° C. was 3.8 mmol/g·h. The initial production rate of ammonia at 400° C. was 3.7 mmol/g·h, and the ammonia formation rate after 30 hours reaction at 400° C. was 6.3 mmol/g·h.

The average particle diameter of Ru was the same as in Example 6, and the average particle diameter of Ru grew greatly due to the reduction process.

After that, although the reaction time was prolonged, no decrease in catalytic activity was observed.

Example 10

Ammonia synthesis reaction was carried out under the same conditions as in Example 6, except that Ru/HT-C12A7 described in Example 2 was used as a catalyst, and the results are shown in Table 3.

As shown in Table 3, the ammonia formation rate after 30 hours reaction at 340° C. was 2.3 mmol/g·h. The initial production rate of ammonia at 400° C. was 3.7 mmol/g·h, and the ammonia formation rate after 30 hours reaction at 400° C. was 4.3 mmol/g·h.

TABLE 3

| | NH$_3$ Synthesis Rate (mmol/g · h) | | |
| --- | --- | --- | --- |
| | 340° C. After 30 hr reaction | 400° C. Initial | 400° C. After 30 hr reaction |
| Example 6 | 4.7 | 4.4 | 6.9 |
| Example 7 | 3.1 | 4.3 | 6.8 |
| Example 8 | 2.7 | 4.0 | 5.9 |
| Example 9 | 3.8 | 3.7 | 6.3 |
| Example 10 | 2.3 | 3.7 | 4.3 |

Figure 5:
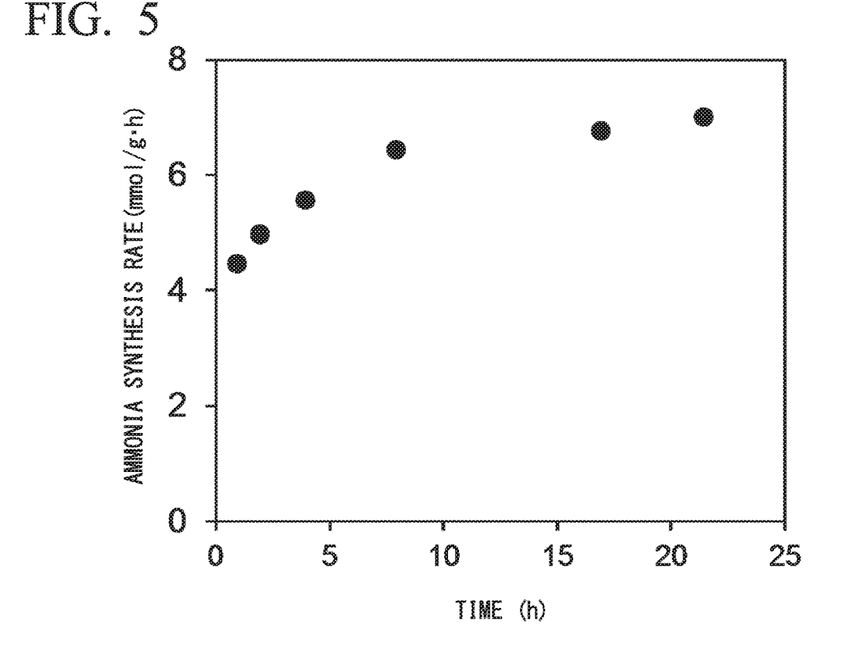
FIG. 5 is a graph showing a time change of an ammonia synthesis reaction when the metal-supported material described in Example 6 was used as an ammonia synthesis catalyst.

FIG. 5 shows the time change of ammonia synthesis when the metal-supported material described in Example 6 was used as an ammonia synthesis catalyst. The reaction conditions were shown as follows: the reaction temperature was 400° C. and the reaction pressure was atmospheric pressure (0.1 MPa). From FIG. 5, it can be seen that the catalyst activity was improved with the reaction time and the catalytic activity was improved to nearly equilibrium conversion. Similarly, the metal-supported materials described in the other examples (Examples 7 to 10) in which Ba was added had improved catalytic activities to a value close to the equilibrium conversion. As a result, performance comparison of each catalyst could not be made at 400° C. Therefore, the reaction temperature was lowered to 340° C. and comparison was made.

Example 11

<Pressure Dependence of Ammonia Synthesis Reaction>

The same catalyst as used in Example 6 was used and the reaction temperature (400° C.) was maintained to constant. The pressure dependence of the ammonia synthesis reaction was investigated by observing change in catalytic activity when the reaction pressure was increased. The results are shown in FIG. 6.

Figure 6:
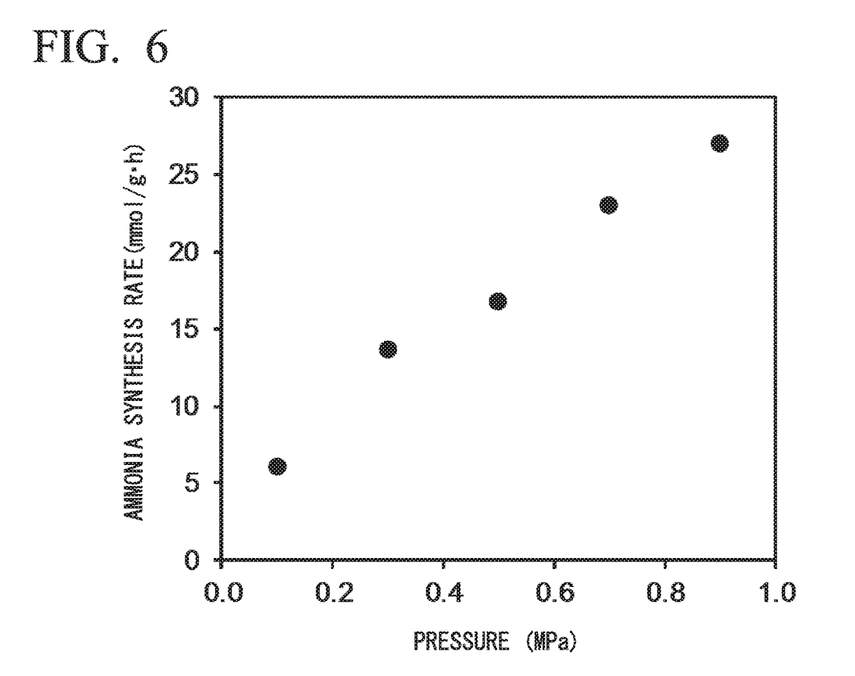
FIG. 6 is a graph showing an investigation result (Example 11) of a change in pressure of an ammonia synthesis reaction when the metal-supported material described in Example 6 was used as an ammonia synthesis catalyst.

FIG. 6 is a graph showing change in catalytic activity when the reaction pressure was increased by keeping the reaction temperature (400° C.) constant when the metal-supported material described in Example 6 was used as an ammonia synthesis catalyst. The results were measured in the same manner as in Example 3A.

As shown in FIG. 6, it was found that the catalyst activity of Example 6 was greatly improved with increasing reaction pressure. The ammonia synthesis rate under the condition pressure of 0.9 MPa was 28 mmol/g·h. This result shows that it is not subjected to hydrogen poisoning as the same as the Ru-supported C12A7 electride.

Example 12

<Temperature Dependence of Ammonia Synthesis Reaction>

The same catalyst as used in Example 6 was used, and the reaction pressure (0.9 MPa) was kept constant.

The temperature dependence of the ammonia synthesis reaction was studied by observing changes in catalytic activity when the reaction temperature was raised. The results are shown in FIG. 7

Figure 7:
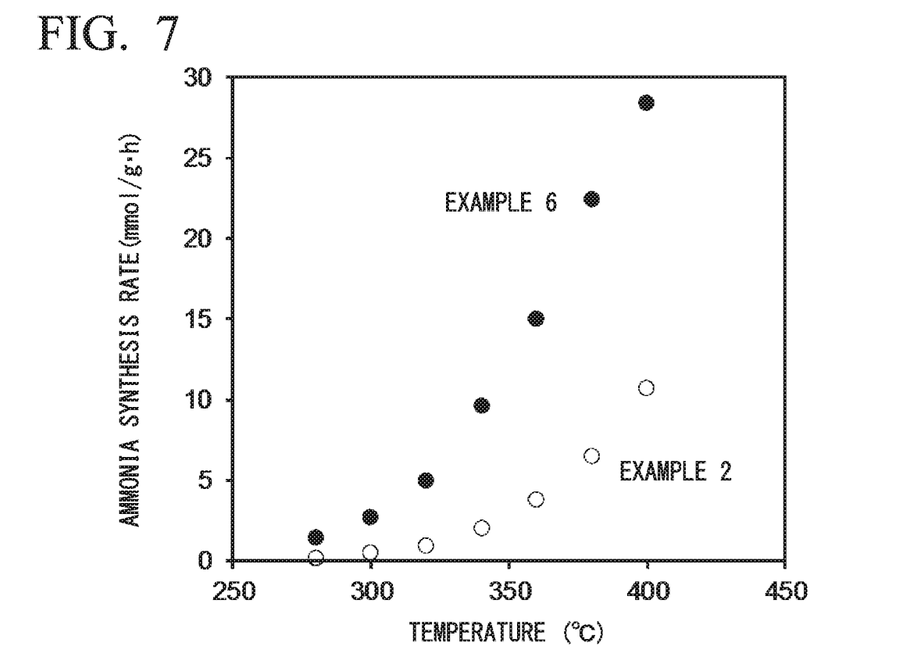
FIG. 7 is a graph showing a result (Example 12) of a change in temperature of an ammonia synthesis reaction when the metal-supported materials described in Example 6 and Example 2 were used as an ammonia synthesis catalyst.

As shown in FIG. 7, when Ba—Ru/HT-C12A7, which is a metal-supported material obtained in Example 6, was used as an ammonia synthesis catalyst, as the reaction temperature increased, the catalytic activity greatly improved. As compared with Ru/HT-C12A7 in which no Ba was added, which was obtained in Example 2, a much higher ammonia synthesis activity was shown within whole temperature range from 280° C. to 400° C. In particular, in the low temperature region of 340° C. or lower, it showed a catalytic activity about 5 times higher than that of Ru/HT-C12A7 in which no Ba was added.

The method for manufacturing an ammonia synthesis catalyst of the present invention is a simple manufacturing method and can produce a catalyst having a high ammonia synthesizing activity. This catalyst made it possible to synthesize ammonia at a low pressure compared with the Haber-Bosch method. Furthermore, an ammonia synthesis can be carried out more conveniently.

The invention claimed is:

1. A method for manufacturing ammonia, the method comprising:
    contacting a gas containing nitrogen and hydrogen with a catalyst,
    wherein the catalyst comprises a metal-supported material comprising:
    $12CaO \cdot 7Al_2O_3$; and
    plural kinds of metal atoms supported on the $12CaO \cdot 7Al_2O_3$,
    wherein a specific surface area of the $12CaO \cdot 7Al_2O_3$ is 5 $m^2/g$ or more; and
    the plural kinds of metal atoms comprises
        a metal ruthenium, and
        an alkali metal atom or an alkaline earth metal atom.

2. The method for manufacturing ammonia according to claim 1, wherein the alkaline earth metal atom is barium.

\* \* \* \* \*